US008615593B2

(12) United States Patent
Ch'ng et al.

(10) Patent No.: US 8,615,593 B2
(45) Date of Patent: Dec. 24, 2013

(54) PROVIDING ZONE INDICATIONS FOR WIRELESS NETWORKING

(75) Inventors: Shi Baw Ch'ng, North Billerica, MA (US); Pierre A. Humblet, Cambridge, MA (US); Amit Mate, Chelmsford, MA (US); Woojune Kim, Arlington, MA (US); Douglas Norman Knisely, Wheaton, IL (US)

(73) Assignee: Airvana LLC, Chelmsford, MA (US)

( * ) Notice: Subject to any disclaimer, the term of this patent is extended or adjusted under 35 U.S.C. 154(b) by 1230 days.

(21) Appl. No.: 11/962,734

(22) Filed: Dec. 21, 2007

(65) Prior Publication Data

US 2009/0164547 A1 Jun. 25, 2009

(51) Int. Cl.
*G06F 15/16* (2006.01)

(52) U.S. Cl.
USPC ......................... 709/228; 709/230; 455/432.1

(58) Field of Classification Search
USPC ................................ 709/228, 230; 455/432.1
See application file for complete search history.

(56) References Cited

U.S. PATENT DOCUMENTS

| | | | | |
|---|---|---|---|---|
| 6,269,395 | B1 * | 7/2001 | Blatherwick et al. | 709/219 |
| 6,711,144 | B1 | 3/2004 | Kim et al. | |
| 6,731,618 | B1 | 5/2004 | Chung et al. | |
| 6,741,862 | B2 | 5/2004 | Chung et al. | |
| 6,781,999 | B2 | 8/2004 | Eyuboglu et al. | |
| 7,170,871 | B2 | 1/2007 | Eyuboglu et al. | |
| 7,200,391 | B2 | 4/2007 | Chung et al. | |
| 7,242,958 | B2 | 7/2007 | Chung et al. | |
| 7,277,446 | B1 | 10/2007 | Abi-Nassif et al. | |
| 7,299,278 | B2 | 11/2007 | Ch'ng | |
| 7,483,984 | B1 * | 1/2009 | Jonker et al. | 709/226 |
| 7,558,356 | B2 | 7/2009 | Pollman et al. | |
| 7,558,588 | B2 | 7/2009 | To et al. | |
| 7,603,127 | B2 | 10/2009 | Chung et al. | |
| 2002/0196749 | A1 | 12/2002 | Eyuboglu et al. | |
| 2003/0100311 | A1 | 5/2003 | Chung et al. | |
| 2005/0213555 | A1 | 9/2005 | Eyuboglu et al. | |
| 2005/0243749 | A1 | 11/2005 | Mehrabanzad et al. | |
| 2005/0245279 | A1 | 11/2005 | Mehrabanzad et al. | |
| 2006/0067422 | A1 | 3/2006 | Chung | |
| 2006/0067451 | A1 | 3/2006 | Pollman et al. | |
| 2006/0069729 | A1 * | 3/2006 | Chen | 709/206 |
| 2006/0126509 | A1 | 6/2006 | Abi-Nassif | |
| 2006/0159045 | A1 | 7/2006 | Ananthaiyer et al. | |
| 2006/0240782 | A1 | 10/2006 | Pollman et al. | |
| 2006/0291420 | A1 | 12/2006 | Ng | |
| 2006/0294241 | A1 | 12/2006 | Cherian et al. | |
| 2007/0026884 | A1 | 2/2007 | Rao | |
| 2007/0058628 | A1 | 3/2007 | Rao et al. | |

(Continued)

FOREIGN PATENT DOCUMENTS

| | | |
|---|---|---|
| GB | 2452688 | 3/2009 |

OTHER PUBLICATIONS

3rd Generation Partnership Project 2 "3GPP2", "cdma2000 High Rate Packet Data Interface Specification", C.S0024, version 2, Oct. 27, 2000 (441 pages).

(Continued)

*Primary Examiner* — Thomas Dailey
(74) *Attorney, Agent, or Firm* — Fish & Richardson P.C.

(57) ABSTRACT

Methods and systems for communicating over a wi.reless network are described. A private access point sends indication information to a mobile station that includes available services provided by the private access point.

51 Claims, 5 Drawing Sheets

(56) References Cited

U.S. PATENT DOCUMENTS

2007/0077948 A1 4/2007 Sharma et al.
2007/0097916 A1 5/2007 Eyuboglu et al.
2007/0115896 A1 5/2007 To et al.
2007/0140172 A1 6/2007 Garg et al.
2007/0140184 A1 6/2007 Garg et al.
2007/0140185 A1 6/2007 Garg et al.
2007/0140218 A1 6/2007 Nair et al.
2007/0155329 A1 7/2007 Mehrabanzad et al.
2007/0220573 A1 9/2007 Chiussi et al.
2007/0230419 A1 10/2007 Raman et al.
2007/0238442 A1 10/2007 Mate et al.
2007/0238476 A1 10/2007 Raman et al.
2007/0242648 A1 10/2007 Garg et al.
2007/0248042 A1 10/2007 Harikumar et al.
2008/0003988 A1 1/2008 Richardson
2008/0013488 A1 1/2008 Garg et al.
2008/0062925 A1 3/2008 Mate et al.
2008/0065752 A1 3/2008 Ch'ng et al.
2008/0069020 A1 3/2008 Richardson
2008/0069028 A1 3/2008 Richardson
2008/0076398 A1 3/2008 Mate et al.
2008/0076412 A1* 3/2008 Khetawat et al. .......... 455/432.1
2008/0117842 A1 5/2008 Rao
2008/0119172 A1 5/2008 Rao et al.
2008/0120417 A1 5/2008 Harikumar et al.
2008/0132239 A1* 6/2008 Khetawat et al. ............. 455/438
2008/0139203 A1 6/2008 Ng et al.
2008/0146232 A1 6/2008 Knisely
2008/0151843 A1 6/2008 Valmikam et al.
2008/0159236 A1 7/2008 Ch'ng et al.
2008/0162924 A1 7/2008 Chinitz et al.
2008/0162926 A1 7/2008 Xiong et al.
2008/0186882 A1* 8/2008 Scherzer et al. ............. 370/310
2008/0253550 A1 10/2008 Ch'ng et al.
2008/0254792 A1 10/2008 Ch'ng
2009/0034440 A1 2/2009 Samar et al.
2009/0061873 A1* 3/2009 Bao et al. ...................... 455/436
2009/0082020 A1 3/2009 Ch'ng et al.
2009/0088155 A1 4/2009 Kim
2009/0111431 A1* 4/2009 Shaffer et al. .............. 455/412.2
2009/0116445 A1 5/2009 Samar et al.
2009/0154447 A1 6/2009 Humblet
2009/0156165 A1 6/2009 Raghothaman et al.
2009/0156195 A1 6/2009 Humblet
2009/0156218 A1 6/2009 Garg et al.
2009/0163202 A1 6/2009 Humblet et al.
2009/0163216 A1 6/2009 Hoang et al.
2009/0163238 A1 6/2009 Rao et al.
2009/0164547 A1 6/2009 Ch'ng et al.
2009/0168766 A1 7/2009 Eyuboglu et al.
2009/0168788 A1 7/2009 Den et al.
2009/0170440 A1 7/2009 Eyuboglu et al.
2009/0170475 A1 7/2009 Ch'Ng et al.
2009/0170520 A1 7/2009 Jones
2009/0170547 A1 7/2009 Raghothaman et al.
2009/0172169 A1 7/2009 Ch'Ng et al.
2009/0172397 A1 7/2009 Kim
2009/0186626 A1 7/2009 Raghothaman et al.
2009/0262697 A1 10/2009 To et al.
2009/0318162 A1 12/2009 Chung et al.

OTHER PUBLICATIONS

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

3rd Generation Partnership Project 2 "3GPP2", "cdma2000 High Rate Packet Data Interface Specification", C.S0024-A, version 1, Mar. 2004 (1083 pages).

* cited by examiner 100
102
104
106
108
109
110
112
116
118a
118b
Radio Network Controller 120a
Radio Network Controller 120b
122
Service Provider's Core Network

300

| Field | Length (bits) |
|---|---|
| RELEASE | 1 |
| One or more occurrences of the following record: | |
| RECORD_TYPE | 8 |
| RECORD_LEN | 8 |
| Type-specific fields | 8 × RECORD_LEN |

| Information Record | Record Type (binary) | Message Type | f-csch | f-dsch |
|---|---|---|---|---|
| Display | 00000001 | FNM | Y | N |
| | | AWI | N | Y |
| | | FWI | N | Y |

| Type-Specific Field | Length (bits) |
|---|---|
| One or more occurrences of the following field: | |
| CHARi | 8 |

FIG. 4

PROVIDING ZONE INDICATIONS FOR WIRELESS NETWORKING

TECHNICAL FIELD

This patent application relates to providing zone indications for wireless networking.

BACKGROUND

Cellular wireless communications systems, for example, are designed to serve multiple wireless-enabled devices distributed over a large geographic area by dividing the area into regions called "cells". At or near the center of each cell, a network-side access device is located to serve client devices located in the cell and commonly referred to as "access terminals" or "mobile stations," terms which may be used interchangeably. Examples of mobile stations include cellular telephones, laptops, PDAs, and other wireless-enabled devices. A mobile station generally establishes a call, also referred to as a "communication session," with an access point to communicate with other entities (e.g., servers) in the network.

The 1xEV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-856-B, 3GPP2 C.S0024-B, version 1.0, May 2006, and is also incorporated herein by reference. Other wireless communication protocols may also be used.

SUMMARY

Home base-stations, which are also referred to as "femto cells" may be deployed in residences and offices to provide indoor coverage and a variety of services at lower cost. In some areas, a large number of femto cells, e.g., hundreds of thousands or millions, may be deployed in an ad-hoc fashion in neighboring residences. A given user's mobile station maybe connected to his/her own femto cell or a neighboring femto cell depending on the user's location. Also certain neighboring femto cells may allow guest access by the user while other neighboring femto cells may restrict it. It is therefore important for the user to know while obtaining mobile phone and other wireless services at home whether it is connected to his/her own femto cell or a neighboring femto cell and whether service is available from the connected femto cell.

In general, in one aspect, the application describes methods and computer programs for communicating over a wireless network. Methods include sending indication information to a mobile station, the indication information identifying a private access point within communication range of the mobile station and available services provided by the private access point; establishing communications between the private access point and the mobile station; and providing one or more of the available services to the mobile stations from the private access point.

In general, in another aspect, the application describes other methods and computer programs for communicating over a wireless network. These methods include, at a mobile station, receiving indication information from a nearby private access point, displaying the indication information on an interface of the mobile station, the indication information including an identifier associated with the private access point and a list of available services provided by the private access point; and sending to the private access point, a service selection command identifying one or more of the available services selected by a user.

In general, in a further aspect, the application describes a private access point for use with a wireless network. The private access point includes memory storing indication information including a unique identifier corresponding to the private access point and available services provided by the private access point; a transmitter configured to transmit indication information to a mobile station; a receiver configured to receive a selection of one or more available services from the mobile station; and one or more processors configured to facilitate communications with the mobile station to provide the one or more available services included in the selection.

In general, in yet a further aspect, the application describes a mobile station for use with a wireless network. The mobile station includes a receiver configured to receive indication information from a nearby private access point, an interface configured to display the indication information, the indication information including an identifier associated with the private access point and a list of available services provided by the private access point; a transmitter configured to send a service selection command to the private access point, the service selection command identifying one or more of the available services selected by a user; and one or more processors configured to control operations of the receiver, interface, and transmitter.

Implementations may include one or more of the following. It may be determined that the private access point has been designated as a home access point for the mobile station; and the indication information may provide a notification that the mobile station is located within a defined coverage area serviced by the private access point. Data stored on a local area network connected to the private access point may be accessed and sent to the mobile station without accessing a core network. The available services may include one or more of: control of a printer, accessing a file server, receiving media files; and receiving targeted information broadcasts. The indication information may be broadcast at predetermined times; sent in response to determining that the mobile station is within communication range of the private access point; or sent in response to receiving a request from the mobile station. The indication information may be embedded in a standard airlink signal.

Embodiments may provide one or more of the following advantages. Femto cells are provided with unique femto zone names and can communicate their names to nearby mobile stations. Femto cells can indicate access restrictions to nearby mobile stations so that the mobile stations can take appropriate actions, e.g., determine whether or not to communicate with certain femto cells. Femto cells can indicate when users have entered their home femto zones. Users are presented with a list of services that are available from a femto cell and can request to use one or more of the available services without having to access a core network.

The details of one or more embodiments are set forth in the accompanying drawings and the description below. Other features, objects, and advantages will be apparent from the description and drawings, and from the claims.

DESCRIPTION OF DRAWINGS

FIG. 3 is a diagram of a Feature Notification Message.

FIG. 4 is a diagram of an Information Record.

DETAILED DESCRIPTION

Cellular wireless communications systems are designed to serve many mobile stations distributed in a large geographic area by dividing the area into areas, often referred to as "cells." At or near the center of each cell, a radio network access point, also referred to as a base transceiver station (BTS), is located to serve mobile stations (e.g., cellular telephones, laptops, PDAs) located in the cell.

In wireless communication networks, the geographic areas served by access points, also referred to as "service areas," may vary in size and may include smaller service areas and/or may be located within larger service areas. Larger geographic areas that include one or more smaller service areas are referred to as "macro cell areas," and an access point that serves a macro cell area is referred to as a "macro cell." Within a macro cell area, one or more access points may be located to serve smaller geographic areas. In some examples a radio network access point may be deployed in a user's home in the same manner as a WiFi® access point. Such a radio network access point is referred to as a private access point or "femto cell." We refer to a femto cell on which a given mobile station is authorized as an "authorized femto cell." A femto cell is assigned to a mobile station as, at least temporarily, as its primary point of access and is referred to as the home femto cell of the mobile station. The area serviced by the home femto cell is referred to as the local or "home" zone of the mobile station.

The access point enables connected mobile stations to communicate with other networks, such as those that enable access to the Internet. The entities that maintain the other networks may require users to pay a fee each time they access the other networks and the fees may be charged on a per-time basis (e.g., $0.10 per-minute) and/or per-service basis (e.g., different rates for different services).

Here we describe systems and methods for providing information in the form of a "femto zone indication" to a mobile station from a femto zone within sufficient proximity to facilitate communications with the mobile station. The femto zone indication, for example, notifies the mobile station when it has entered its home femto zone or another femto zone; any access restrictions applied by the femto cell, and services that can be provided to the mobile station from the femto cell. Users may incur lower charges when services are provided though their home femto cells rather than other access points. A femto cell may be configured to provide services that do not require the user to access a core network, thus allowing its users to avoid additional charges that would otherwise be incurred for using the core network.

Figure 1:
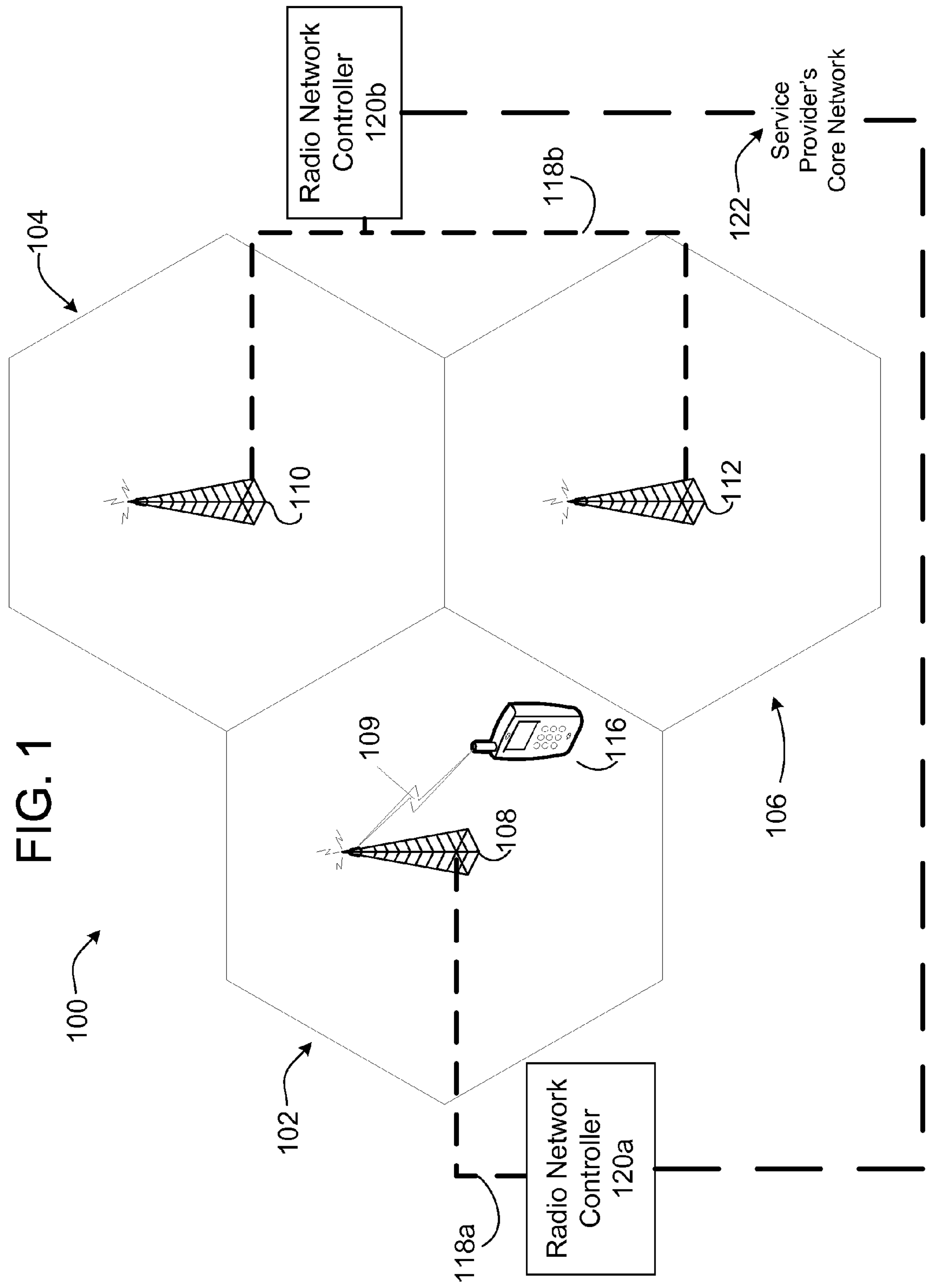
FIG. 1 is a block diagram of a radio access network (RAN).

Referring to FIG. 1, a radio access network (RAN) 100 includes multiple access points or "macro cells" 108, 110, and 112 located in macro cell areas 102, 104, and 106, respectively. The macro cell areas 102, 104, and 106 can include one or more femto cells (not shown). The macro cells 108, 110, and 112 are each configured to communicate with a mobile station over an airlink. For example, the macro cell 108 communicates with the mobile station 116 over an airlink 109. Macro cells 108, 110, and 112 are connected over a backhaul connection (e.g., backhaul connection 118*a* or 118*b*) to a radio network controller (RNC) which in turn communicates with the service provider's core network, e.g., RNC 120*a* or 120*b*, which may be one or more physical devices at different locations.

The RAN 100 is configured to support various mobile wireless access technologies, examples of which include UMTS and CDMA 2000. Other wireless communication standards may also be used. Examples of these include CDMA 1x EV-DO, CDMA2000, WiMax, WiBro, WiFi, and the like.

Figure 2:
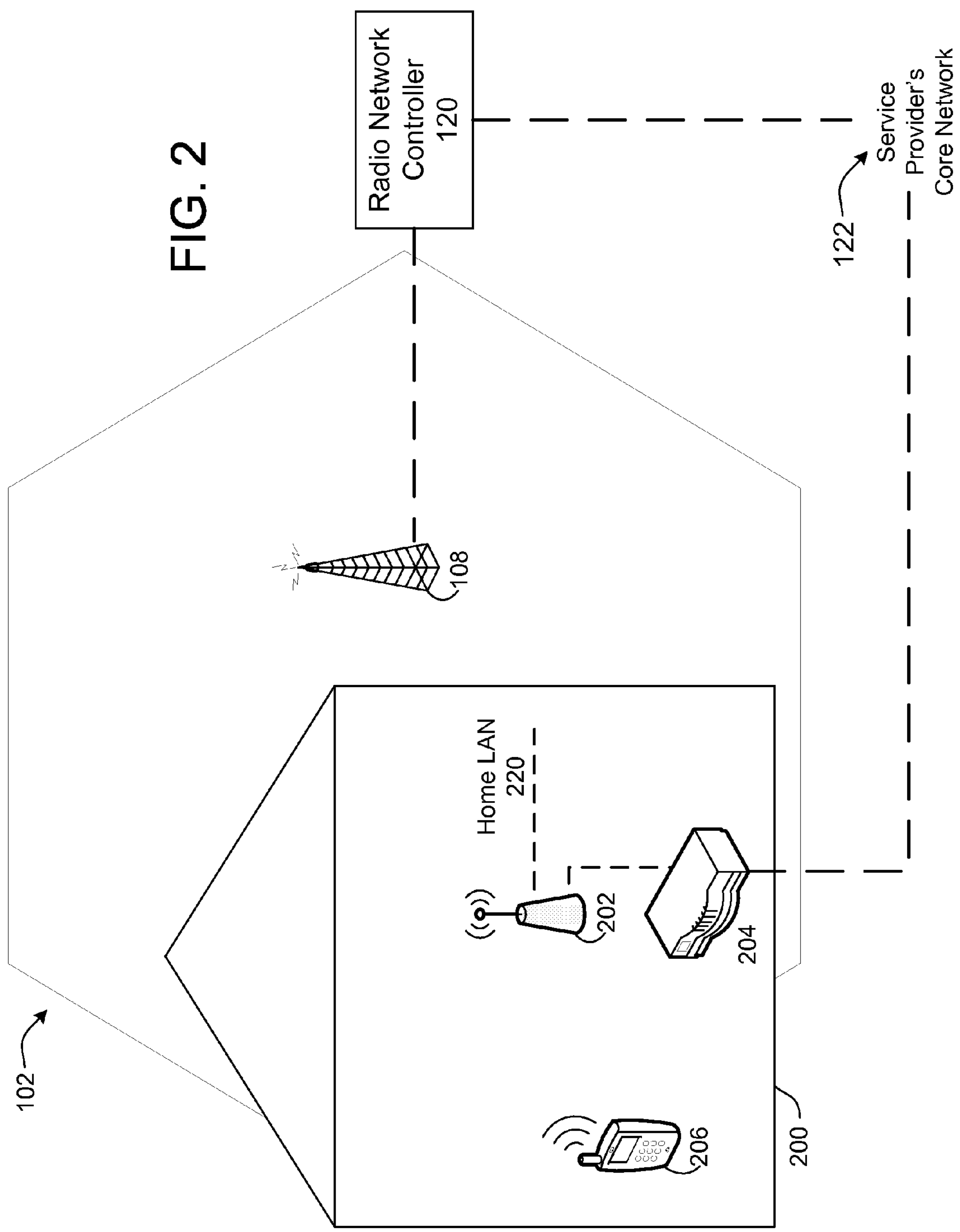
FIG. 2 is a block diagram of femto zone.

Referring to FIG. 2, a femto cell 202 may be deployed in a user's home 200 in the same manner as a WiFi® access point. The femto cells 202 may use any available high-speed internet connection device 204 to connect to a service provider's core network 122. The device 204 serves as the backhaul with the RNC/PDSN functionality, and may for example be implemented as DSL or cable modem. The femto cell 202 may be installed anywhere that it is advantageous to do so, for example, in an office, a public space, or a restaurant. When this description refers to a femto cell being in a "home" or "home zone" that encompasses any such location. In some examples, the femto cell 202 may be integrated into a cable modem or other network hardware, such as a router or WiFi access point.

When an authorized mobile station 206 is present inside the home or anywhere within range of the femto cell 202, it may use the femto cell 202 rather than a regular cellular radio network access point (e.g., access point 108 of FIG. 1) to place or receive voice calls and data connections, even if it is otherwise within the cell 102 for that access point 108. Some details and examples are discussed in co-pending application Ser. No. 11/640,503, titled Configuring Preferred User Zone Lists for Private Access Points for Wireless Networking, filed Dec. 15, 2006, which is incorporated here by reference.

Each femto cell within a network, including femto cell 202, is assigned a unique identifier, e.g., an alphanumeric string. Uniqueness of the femto-zone name can be ensured when the femto cell 202 is installed can also allow users to select femto-zone name during service activation or through web. The femto cell 202 includes a configurable list of users authorized to connect to the femto cell. The list may also include access restrictions for different users on the list. The access list of the femto cell 202 also includes the identities of mobile stations belonging to one or more users who own the femto cell or who are assigned as its primary custodians. The femto cell 202 is designated as a home femto cell for its owner/custodian and it coverage zone, referred to as a femto zone, is designated as a home femto zone.

The femto cell 202 sends an indication signal to the mobile station 206 to inform the mobile station 206 of its presence and of the services it is capable of providing to the mobile station 206. In some configurations, the femto cell 202 sends a femto zone indication signal in response to determining that the mobile station 206 is within a sufficient communication range, e.g., the mobile station 206 has entered the femto zone serviced by the femto cell 202. In other configurations, the femto cell 202 broadcasts the femto zone indication signal at predetermined times, e.g., periodically. In further configurations, the femto cell 202 sends the femto zone indication signal in response to receiving a request for an indication signal from the mobile station 206. The femto cell 202 may send the femto zone indication signal in response to other events as well, e.g., in response to communications being established between it and the mobile station 206.

The indication signal includes various information, collectively referred to as a femto zone indication, for display on an interface of the mobile station. The femto zone indication includes the identity of the femto cell 202 and a list of services provided by the femto cell. In some embodiments, the femto zone indication includes the following information:

The unique femto zone name assigned to the femto cell.

Any access restrictions to be applied to the mobile station based on the femto cell's configured access list.

Indications when other mobile stations enter or exit the femto zone and whether or not they are authorized to access the femto cell.

Services provided by the femto cell.

Protocols supported by the femto cell.

The femto cell 202 is equipped to provide services to the mobile station 206 that may or may not require access to the core network 122. Services that do not require access to the core network 122 are referred to as "local services." The femto zone indication, when presented on the mobile station 206, may indicate which of the services are local services.

Local services are provided locally from the home local area network (LAN) 220. For example, local services may include printing services that rely only on the LAN 220 and one or more printers connected to the LAN 220. Local service may also provide requested data from a file server or other local computing devices connected to the home LAN 220. For instance, the data could include streaming audio files (e.g., MP3) or other media files stored on a local computing device.

Services provided by the femto cell 202 in general, which may rely on the core network 122 include, for example, conference calling services that require the core network's support. Other examples include providing email and Internet access through the core network 122. The femto cell 202 may also be modified to obtain certain information or data from the core network 122 and send it to the mobile station 206. In one example, the femto cell 202 may periodically obtain the latest news headlines and send them to the mobile station 206. In another example, the femto cell 202 enables a user to access locally stored files, e.g., emails and/or webpages, that had been previously downloaded from the core network 122 onto the LAN 220.

As shown above, a femto zone indication may indicate which protocols are supported by the femto cell 202, and which optional features and/or capabilities defined by those protocols are supported by the femto cell 202.

Other types of information may be included in the femto zone indication, in addition to or in place of, the information described above.

A femto zone indication may be displayed in various forms including, but not limited to: different icons representing different services available, text strings, screen shots, audio tones, or a combination thereof. A femto zone indication may appear as one or more messages displayed in a console of the mobile station. For example, a text string can be temporarily displayed on the mobile station 206 using a feature notification message (FNM) and an information record for display or extended display. Examples of an FNM 300 and an information record 400 are shown in FIGS. 3 and 4, respectively.

Moreover, the femto zone indication may also be accompanied by a specific tone and/or icon, so that the subscriber knows both the present location and the type of the charge rate that is currently applied. In some embodiments, an operator sells femto cells and charges flat rate for use of a femto cell at a lower charge than the use of the core network. Calls made through femto are included in the flat rate with no additional charge.

Figure 5:
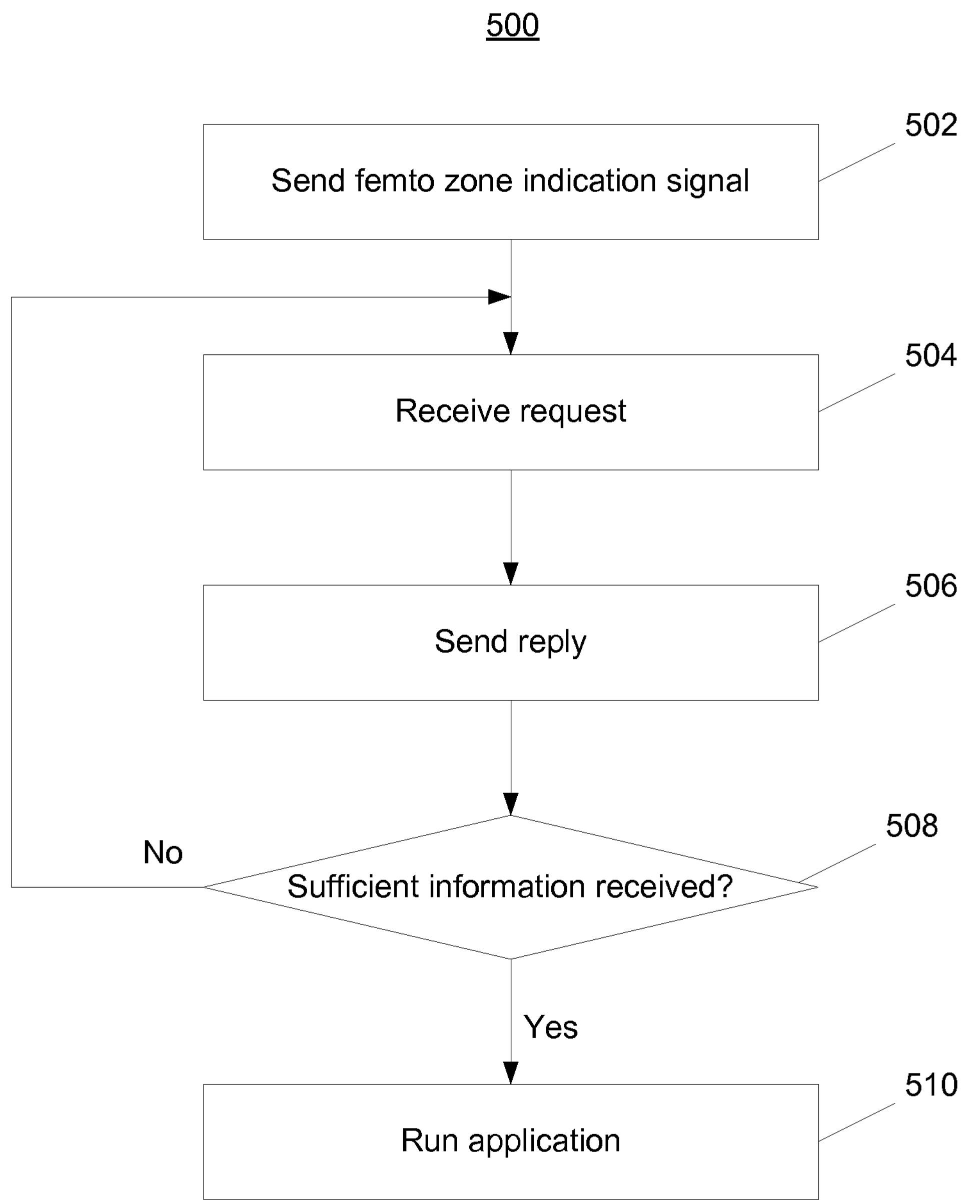
FIGS. 5 and 6 are flowcharts of femto zone indication processes.

Referring to FIG. 5, a flowchart of a process 500, implemented by a femto cell 202, for providing services to a mobile station 202. The process 500 begins by sending (502) a femto zone indication signal to the mobile station 206. As describe above, the femto zone indication includes a unique identifier corresponding to the femto cell 202 and services that are available from the femto cell 202. The femto zone indication also indicates whether the mobile station 206 is located within its home zone. The femto cell 202 may send the indication signal in accordance with a variety of different configurations.

In some embodiments, the femto zone indication signal may deployed on a dedicated carrier or communication channel. For example, the femto zone indication signal may be transmitted using wireless cellular communication standards or using other so-called "out-of-band" modalities such as radio frequency identification (RFID) or Bluetooth, in which the femto zone indication signal resides in a communication channel that is separate from the channels used for cellular communications. In these embodiments, the mobile station 206 is equipped with appropriate hardware and software to detect when mobile station 206 is attached to the dedicated carrier.

In other embodiments, the femto zone indication signal may be sent as part of another signal. For example, the femto zone indication signal may consist of a portion of another signal or group of signals, e.g, one or more airlink messages, received by the mobile station 206. In these embodiments, the femto cell may embed the femto zone indication signal within standard messages broadcast by the femto cell. These messages include a system identification message (SID), a network identification message (NID), a packet zone identification message (PZID) and a SubnetID message. Predefined bits may from one or more of the SID/NID/PZID and/or SubnetID may be reserved to hold in bit patterns that are consistent across multiple femto cells. For example, the first ten consecutive bits of SID/NID/PZID and/or SubnetID broadcast from various femto cells are all reserved for the femto zone indication. The mobile station 206 is equipped with software to recognize the reserved bit patterns within the SID/NID/PZID and/or SubnetID and extract the information.

In further embodiments, femto zone indication is sent as part of a sector parameter message (SPM) broadcasted by the femto cell 202. A pre-determined value in a chosen optional parameter in the System Parameter Message may be used to indicate when the mobile station 206 has entered its home zone. The mobile station user interface software can detect when the mobile station 206 is attached to a sector that had broadcast this pre-determined value in the chosen optional parameter in the System Parameter Message.

The sending (502) of the femto zone indication signal may be triggered manually, rather than automatically, by a user when the user enters his/her home femto zone. In this case, the femto cell 202 is equipped with a manual control, e.g., a button or switch, that when actuated by a user, would force the femto cell 202 to transmit the femto zone indication signal to the mobile station 206.

After the femto zone indication signal has been sent to the mobile station 206, the process 500 waits for the mobile station to send a request to connect to the femto cell 202 and/or receive one or more of the services advertised in the femto zone indication. After receiving (504) a request, the process 500 sends (506) a reply back to the mobile station 206. The reply may include a simply confirmation that the request has been received. The reply may also include a prompt requesting further information. For example, if the request received from the mobile station 206 is for an music streaming service, the femto cell 202 might respond with a reply that requests the user to select a genre of music from a list of choices. The receiving and sending steps 504 and 506 are repeated until the process determines (508) that sufficient information has been received from the mobile station 206 to provide it with the local service(s) that have been requested. The process 500 runs (510) one or more applications necessary for providing the services(s) to the mobile station 206. Specific examples are provided further below to illustrate the provision of services from the femto cell 202 to the mobile station 206.

Figure 6:
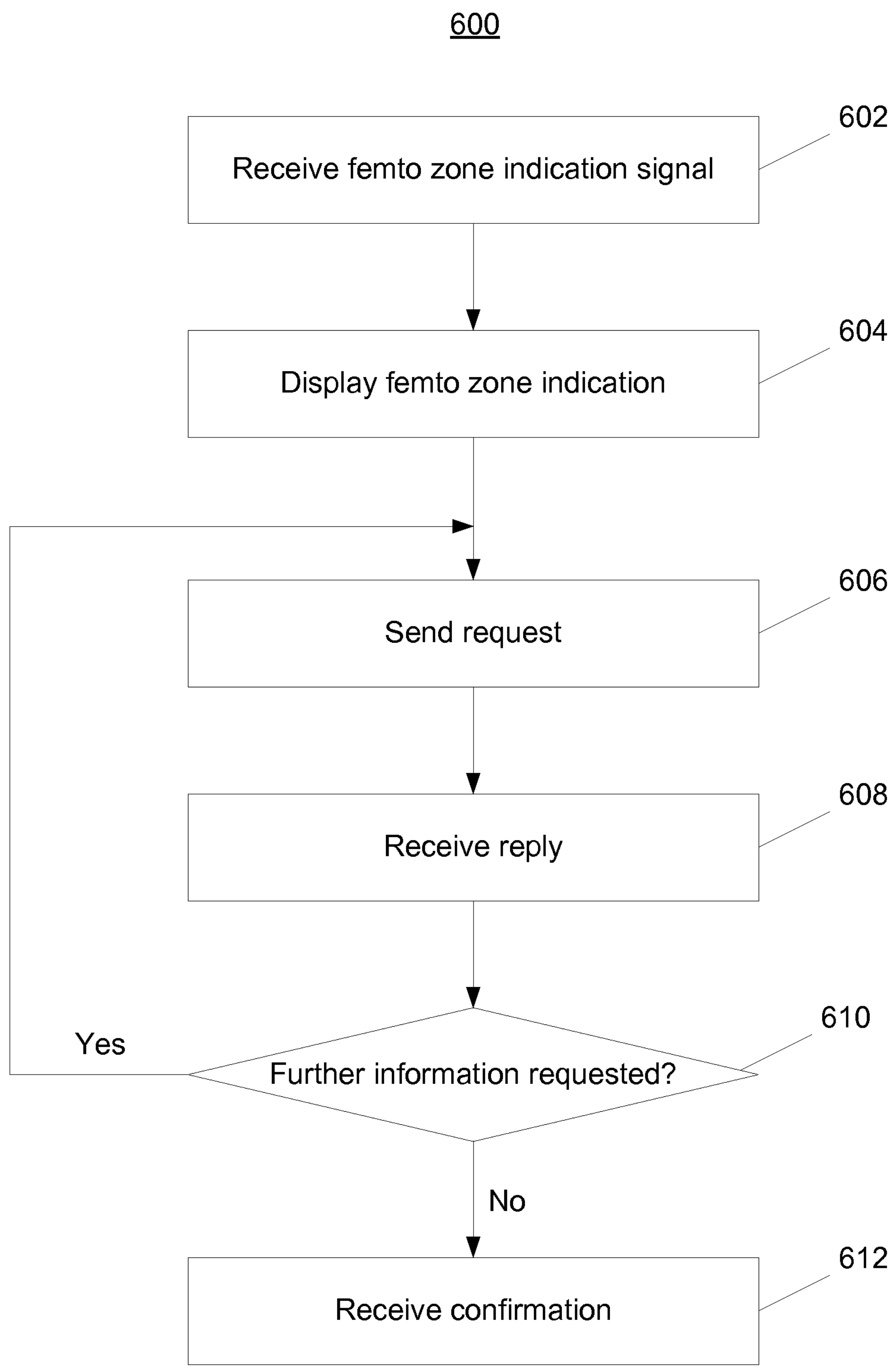

Referring to FIG. 6, a flowchart of a process 600, implemented by a mobile station 202, for receiving services provided by a femto cell 206 is shown. The process 500 begins when the mobile station 206 receives (602) a femto zone indication signal from the femto cell 202. As described above, the mobile station 206 may receive the femto zone indication signal on a dedicated carrier or as part of one or more airlink messages carried over cellular communication channels. In some implementations, the mobile station 206 includes software to recognize and extract the femto zone indication or portions thereof from the airlink messages or parameters. This software may include downloadable software application, e.g., downloadable Brew Applications or other types of applications for mobile stations, such as those based on the Symbian® OS or Palm® OS.

The mobile station software may be configured or updated to recognize new standardized signaling or signaling patterns that indicate other capabilities and/or services that the mobile station 206 may obtain through the femto cell 202 from devices on the home LAN 220. In one example, a femto zone indication that tells the user there is an MP3 streaming juke box on the home LAN 220, which the mobile station 206 can access via the femto cell 202. In the example, the femto cell 202 learns about the existence of this juke box service via DNS (domain name system), DHCP (dynamic host configuration protocol), LDAP (lightweight directory access protocol), Rendezvous, UPnP (universal plug and play) or other service discovery/brokering protocols. In accordance with step 502 of FIG. 5, the femto cell 202 sends a femto zone indication message (e.g., SMS messages) to inform the mobile station 206 about the existence of these services when the mobile station 206 connects to the femto cell 202. As described above, the different bit patterns may be defined in the various parameters of a SPM or other airlink messages to indicate the availability of different services provided by the femto cell 202.

The information encoded in the femto zone indication is displayed (604) on the console of the mobile station 206. The femto zone indication may be displayed, for example, in response to an event, e.g., after the mobile station 206 registers with the femto cell 202, after the mobile station 206 receives a service call, or after the mobile station places a service call with the femto cell 202. The femto zone indication may also be displayed periodically, e.g., when the mobile station 206 picks a femto zone indication signal broadcasted periodically by the femto cell 202.

The femto zone indication may be displayed using one or more of alphanumeric strings, icons, screenshots and other visual indications. For example, one or more SMS messages may be used to display all or a portion of the femto zone indication. Display (604) of the femto zone indication may also cause audio tones to be played by the mobile station to indicate the occurrence of specific events. For example, different audio tones may be used to indicate the origination and termination of active calls. An audio tone may also be used to indicate that the mobile station 206 has just entered its home zone and/or that the mobile station is presently located within its home zone. This "home zone" tone may be played at the beginning of any call whether originated or terminated. In some implementations, audio CWI indications are used when entering the home zone. With these indications, applications such as Flash with Info or BSOrder may be used to generate specific tones.

The user can control which visual indication and tones are displayed for different events. User settings are stored in memory of the mobile station 206 and may be reconfigured at subsequent times. In some embodiments, the mobile station 206 includes software that enables a user to download images, tones, and other media from a computer on the home LAN 220 or from other works, such as the Internet, via the core network 122.

After the mobile station 206 receives (602) and displays (604) the available services to a user, it receives a selection of one or more of the services and sends (606) a request to the femto cell 202 for those services. The mobile station 206 receives (608) a reply from the femto cell 202, which in some cases is a simple confirmation that the user's request has been received. The reply may also include a request for further information. The sending and receiving steps 606 and 608 are repeated until the process 600 determines (610) that no further information has been requested by the femto cell 202. The process 600 receives confirmation that the requested service(s) will be provided by the femto cell 202.

If the mobile station 206 is located within its home femto zone, the user is charged an appropriate rate for services rendered by the home femto cell. This rate is generally lower than the rates that would be applied for providing the same services from a non-home femto cell or from the core network 122 of a service provider. In some embodiments, certain services, e.g., local services, provided through a home femto cell incur no additional charges and instead are provided for a flat rate for use of the home femto cell at a lower charge than if the services were provided over the core network 122. Phone calls and data received and sent through the home femto cell 202 are included in the flat rate, thus providing noticeable savings to user who opt to use local services provided by the home femto cell 202 instead of the core network 122, which also reduces traffic on the core network 122.

EXAMPLES

The following example shows how a user may interact with a mobile station 206 to receive services from the femto cell 202.

- Use special #nnn# or *-code dialing that the femto cell will terminate
- Upon getting a #nnn# or *-code call, the femto cell can
  - Send SMS listing all the services that can be made available to the phone
- Generalizing the above idea further still, the #nnn#/*-code dialing can be use as a conduit to provide interactive service.
- Example:
  - Phone sends "#123#" to femto cell
  - Femto cell replies with an SMS message as follows:
    - Available Service:
    - #1231#=Audio Streaming
    - #1232#=Printer Service
    - #1233#=Joke of the day
  - Phone can further sends "#1231#" to femto cell, indicating that it wants to stream audio to the phone
  - Femto cell replies with another SMS message as follows:
    - #12311#=American Top 40
    - #12312#=Beethoven Late Quartets
    - #12313#=Audio Book: Peters & Waterman—In Search of Excellence
  - Phone sends "#12313#" to femto cell
  - Femto cell calls the phone and starts streaming "Audio Book: Peters & Waterman—In Seach of Excellence" to the phone In the above example, the mobile station 206 sends commands or selections in form of "# . . . #" to the femto cell 202.

This does not mean that the user has to dial "# . . . #" himself as there can be other user-friendly GUI software sitting on top of the basic interactive service query/indication protocol described above.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions by operating on input data and generating output. Method steps can also be performed by, and apparatuses can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. The techniques described herein can be performed in a different order and still achieve desirable results.

What is claimed is:

1. A method comprising:

determining that a mobile station is within communication range of a private access point configured to access a local area network and a core network;

sending, to the mobile station, information indicative of one or more available services provided by the private access point through access to the local area network and independent of access to the core network;

receiving, from the mobile station, a request for a service from the one or more available services;

accessing a plurality of applications for providing the one or more available services;

determining, based on accessing, that the request comprises an amount of information that is less than a threshold amount of information required for selection of an application that provides the service;

sending to the mobile station a request for additional information associated with the service;

selecting, at least partly based on a response to the request for additional information, the application that provides the service; and providing, over the local area network, the application to the mobile station.

2. The method of claim 1, further comprising:

determining that the private access point has been designated as a home access point for the mobile station;

wherein the information indicative of the one or more available services provides a notification that the mobile station is located within a coverage area serviced by the private access point.

3. The method of claim 1, wherein providing comprises:

accessing data stored by the local area network; and sending the data to the mobile station.

4. The method of claim 1, wherein the one or more available services comprise one or more of: a service for controlling a printer, a service for accessing a file server, a service for receiving media files, and a service for receiving targeted information broadcasts.

5. The method of claim 1, further comprising:

establishing one or more communication channels between the mobile station and the private access point.

6. The method of claim 1, wherein sending the information indicative of the one or more available services comprises broadcasting the information at one or more predetermined times.

7. The method of claim 1, wherein sending the information indicative of the one or more available services occurs in response to determining that the mobile station is within communication range of the private access point.

8. The method of claim 1, wherein sending the information indicative of the one or more available services occurs in response to receiving a request for the information from the mobile station.

9. The method of claim 1, wherein the information indicative of the one or more available services is embedded in a standard airlink signal.

10. A method performed by a mobile station, the method comprising:
- determining that a private access point is within communication range of the mobile station, the private access point configured to access a local area network and a core network;
- receiving, from the private access point, information indicative of one or more available services provided by the private access point through access to the local area network and independent of access to the core network;
- sending, to the private access point, one or more service selection commands, at least one of the one or more service selection commands identifying a selected service from the one or more available services;
- receiving, from the private access point, a request for additional information associated with the selected service;
- sending, to the private access point in response to the request for additional information, one or more messages comprising a threshold amount of information required for the private access point to select an application that provides the mobile station with the selected service; and
- receiving, from the private access point through the local area network, the application that provides the selected service.

11. The method of claim 10, wherein the information indicative of the one or more available services provides a notification that the mobile station is located within a defined home coverage area serviced by the private access point.

12. The method of claim 10, further comprising:
- playing a predefined audio tone to indicate that the mobile station has entered a home coverage area defined for a user of the mobile station.

13. The method of claim 10, further comprising:
- accessing data stored by the local area network.

14. The method of claim 10, wherein the one or more available services comprise one or more of: a service for controlling a printer, a service for accessing a file server, a service for receiving media files, and a service for receiving targeted information broadcasts.

15. The method of claim 10, further comprising:
- receiving information indicative of (i) one or more protocols supported by the private access point, and (ii) one or more optional features defined by the one or more protocols that are supported by the private access point.

16. The method of claim 10, further comprising:
- extracting the information indicative of the one or more available services from one or more received airlink messages.

17. The method of claim 10, wherein receiving the information indicative of the one or more available services occurs in response to the mobile station entering a coverage area serviced by the private access point.

18. The method of claim 10, further comprising:
- receiving information indicative of one or more access restrictions based on a configured access list.

19. The method of claim 10, further comprising:
- receiving the selected service from the private access point.

20. A private access point comprising:
- one or more processing devices;
- one or more machine-readable devices storing instructions that are executable by the one or more processing devices to perform operations comprising:
  - determining that a mobile station is within communication range of the private access point configured to access a local area network and a core network;
  - sending, to the mobile station, information indicative of one or more available services provided by the private access point through access to the local area network and independent of access to the core network;
  - receiving, from the mobile station, a request for a service from the one or more available services;
  - accessing a plurality of applications for providing the one or more available services;
  - determining, based on accessing, that the request comprises an amount of information that is less than a threshold amount of information required-for selection of an application that provides the service;
  - sending to the mobile station a request for additional information associated with the service;
  - selecting, at least partly based on a response to the request for additional information, the application that provides the service; and
  - providing, over the local area network, the application to the mobile station.

21. The private access point of claim 20, wherein the operations further comprise:
- determining that the private access point has been designated as a home access point for the mobile station.

22. The private access point of claim 20, wherein the operations further comprise:
- detecting an out-of-band signal transmitted by the mobile station, the out-of-band signal residing in a communication channel separate from one or more channels used for cellular communications by the mobile station; and
- sending the information indicative of the one or more available services to the mobile station in response to receiving the out-of-band signal.

23. The private access point of claim 22, wherein the out-of-band signal comprises one or more of a radio-frequency identification and a Bluetooth signal.

24. The private access point of claim 22, wherein the operations further comprise:
- embedding the information indicative of the one or more available services in a parameter message that is transmitted according to a communications standard.

25. The private access point of claim 24, wherein the communications standard comprises a Evolution-Data Optimized (EV-DO) protocol.

26. The private access point of claim 20, wherein sending the information indicative of the one or more available services comprises:
- sending the information indicative of the one or more available services to the mobile station in response to detecting a communication connection between the mobile station and the private access point.

27. The private access point of claim 20, wherein the operations further comprise:
- communicating with the core network via a radio access network coupled to the core network and to the private access point; and
- determining the one or more available services using one or more service discovery protocols.

28. A mobile station comprising:

one or more processing devices;

one or more machine-readable devices storing instructions that are executable by the one or more processing devices to perform operations comprising:

determining that a private access point is within communication range of the mobile station, the private access point configured to access a local area network and a core network;

receiving, from the private access point, information indicative of one or more available services provided by the private access point through access to the local area network and independent of access to the core network;

sending, to the private access point, one or more service selection commands, at least one of the one or more service selection commands identifying a selected service from the one or more available services;

receiving, from the private access point, a request for additional information associated with the selected service;

sending, to the private access point in response to the request for additional information, one or more messages comprising a threshold amount of information required for the private access point to select an application that provides the mobile station with the selected service; and receiving, from the private access point through the local area network, the application that provides the selected service.

29. The mobile station of claim 28, wherein the information indicative of the one or more available services comprises one or more of: icons, text strings, screen shots, and sounds.

30. The mobile station of claim 28, wherein the operations further comprise:

storing a configured access list comprising information indicative of authorized mobile stations, wherein the information indicative of the one or more available services comprises one or more access restrictions based on the information in the configured access list.

31. The mobile station of claim 28, wherein the operations further comprise:

receiving, from the private access point, a prompt for a user command; and rendering, on a display device, the prompt for the user command.

32. The mobile station of claim 28, wherein the operations further comprise:

receiving a user-defined query for categories of data provided by the private access point;

sending the user-defined query to the private access point;

receiving a listing of categories of data from the private access point; and rendering a visual representation of the listing.

33. One or more machine-readable devices storing instructions that are executable by one or more processing devices of a private access point to perform operations comprising:

determining that a mobile station is within communication range of the private access point configured to access a local area network and a core network;

sending, to the mobile station, information indicative of one or more available services provided by the private access point through access to the local area network and independent of access to the core network;

receiving, from the mobile station, a request for a service from the one or more available services;

accessing a plurality of applications for providing the one or more available services;

determining, based on accessing, that the request comprises an amount of information that is less than a threshold amount of information required-for selection of an application that provides the service;

sending to the mobile station a request for additional information associated with the service;

selecting, at least partly based on a response to the request for additional information, the application that provides the service; and providing, over the local area network, the application to the mobile station.

34. The one or more machine-readable devices of claim 33, wherein the operations further comprise:

determining that the private access point has been designated as a home access point for the mobile station; and providing a notification that the mobile station is located within a defined coverage area serviced by the private access point.

35. One or more machine-readable devices storing instructions that are executable by one or more processing devices of a mobile station to perform operations comprising:

determining that a private access point is within communication range of the mobile station, the private access point configured to access a local area network and a core network;

receiving, from the private access point, information indicative of one or more available services provided by the private access point through access to the local area network and independent of access to the core network;

sending, to the private access point, one or more service selection commands, at least one of the one or more service selection commands identifying a selected service from the one or more available services;

receiving, from the private access point, a request for additional information associated with the selected service;

sending, to the private access point in response to the request for additional information, one or more messages comprising a threshold amount of information required for the private access point to select an application that provides the mobile station with the selected service; and receiving, from the private access point through the local area network, the application that provides the selected service.

36. The one or more machine-readable devices of claim 35, wherein the information indicative of the one or more available services provides a notification that the mobile station is located within a defined home coverage area serviced by the private access point.

37. The one or more machine-readable devices of claim 33, wherein providing comprises:

accessing data stored by the local area network; and sending the data to the mobile station.

38. The one or more machine-readable devices of claim 33, wherein the one or more available services comprise one or more of: a service for controlling a printer, a service for accessing a file server, a service for receiving media files, and a service for receiving targeted information broadcasts.

39. The one or more machine-readable devices of claim 33, wherein the operations further comprise:

establishing one or more communication channels between the mobile station and the private access point.

40. The one or more machine-readable devices of claim 33, wherein sending the information indicative of the one or more available services comprises broadcasting the information at one or more predetermined times.

41. The one or more machine-readable devices of claim 33, wherein sending the information indicative of the one or more available services occurs in response to determining that the mobile station is within communication range of the private access point.

42. The one or more machine-readable devices of claim 33, wherein sending the information indicative of the one or more available services occurs in response to receiving a request for the information from the mobile station.

43. The one or more machine-readable devices of claim 33, wherein the information indicative of the one or more available services is embedded in a standard airlink signal.

44. The one or more machine-readable devices of claim 35, wherein the operations further comprise:

playing a predefined audio tone to indicate that the mobile station has entered a home coverage area defined for a user of the mobile station.

45. The one or more machine-readable devices of claim 35, wherein the operations further comprise:

accessing data stored by the local area network.

46. The one or more machine-readable devices of claim 35, wherein the one or more available services comprise one or more of: a service for controlling a printer, a service for accessing a file server, a service for receiving media files, and a service for receiving targeted information broadcasts.

47. The one or more machine-readable devices of claim 35, wherein the operations further comprise:

receiving information indicative of (i) one or more protocols supported by the private access point, and (ii) one or more optional features defined by the one or more protocols that are supported by the private access point.

48. The one or more machine-readable devices of claim 35, wherein the operations further comprise:

extracting the information indicative of the one or more available services from one or more received airlink messages.

49. The one or more machine-readable devices of claim 35, wherein receiving the information indicative of the one or more available services occurs in response to the mobile station entering a coverage area serviced by the private access point.

50. The one or more machine-readable devices of claim 35, wherein the operations further comprise:

receiving information indicative of one or more access restrictions based on a configured access list.

51. The one or more machine-readable devices of claim 35, wherein the operations further comprise:

receiving the selected service from the private access point.

* * * * *

UNITED STATES PATENT AND TRADEMARK OFFICE

CERTIFICATE OF CORRECTION

PATENT NO. : 8,615,593 B2
APPLICATION NO. : 11/962734
DATED : December 24, 2013
INVENTOR(S) : Shi Baw Ch'ng It is certified that error appears in the above-identified patent and that said Letters Patent is hereby corrected as shown below:

On the Title page Col. 2 item (57) (Abstract), Line 1, delete "wi.reless" and insert -- wireless --, therefor.

In the Claims

Column 12, Line 21, In Claim 20, delete "required-for" and insert -- required for --, therefor.

Column 14, Line 5, in Claim 33, delete "required-for" and insert -- required for --, therefor.

Signed and Sealed this
Thirteenth Day of May, 2014

Michelle K. Lee

Michelle K. Lee
*Deputy Director of the United States Patent and Trademark Office*